Patented June 28, 1949

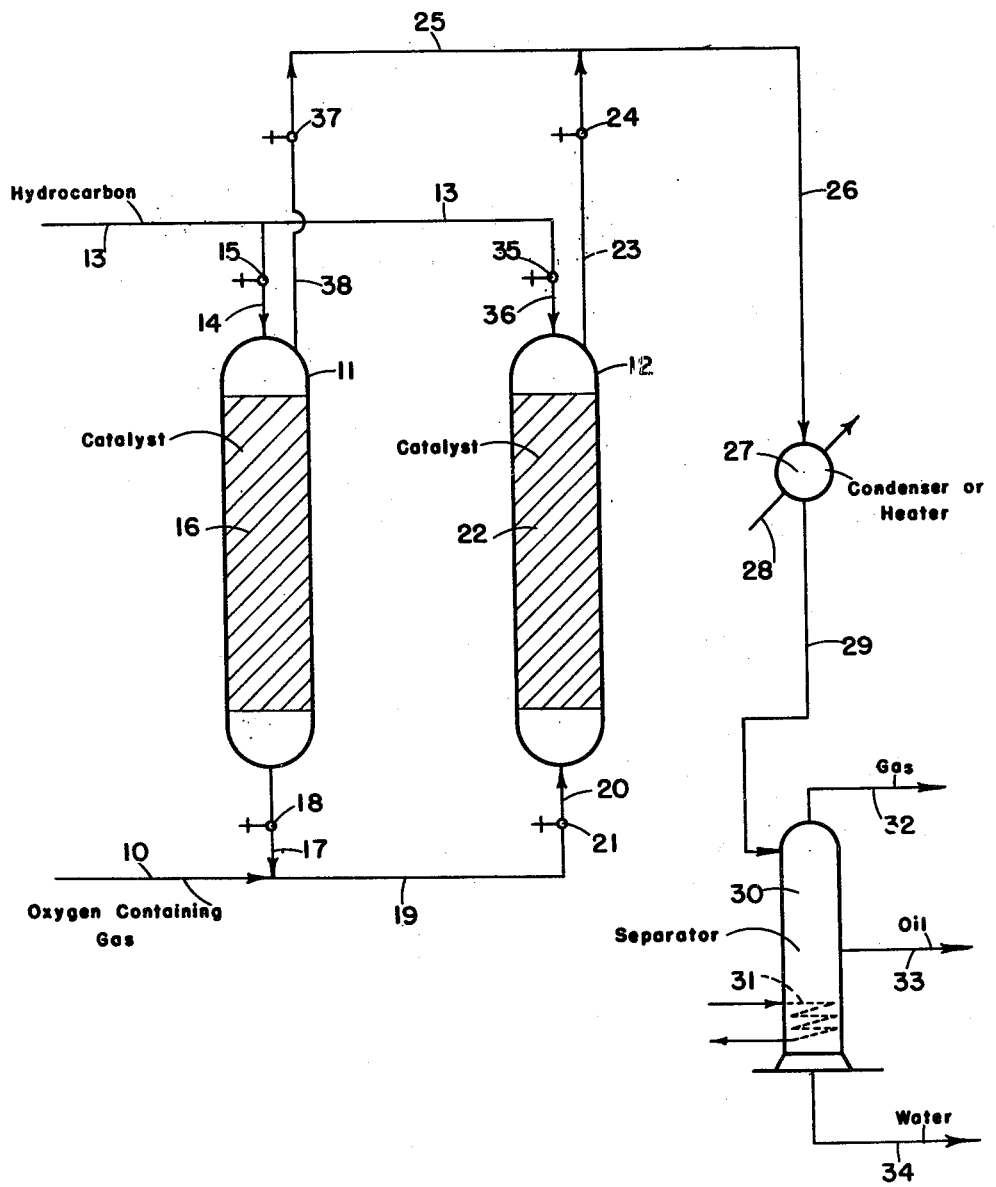

2,474,334

UNITED STATES PATENT OFFICE 2,474,334

PRODUCING MALEIC ACID BY OXIDATION OF CYCLOHEXANE

Albert J. Shmidl, Houston, Tex., assignor, by mesne assignments, to Standard Oil Development Company, Elizabeth, N. J., a corporation of Delaware Application April 10, 1947, Serial No. 740,563

1 Claim. (Cl. 260—533)

The present invention relates to a method for oxidizing hydrocarbons to produce useful oxygenated compounds therefrom. More particularly, the invention is concerned with a method for oxidizing hydrocarbons to produce alcohols, aldehydes, carboxylic acids and other products of oxidation.

It has long been known that oxygenated compounds of the nature mentioned above may be produced from hydrocarbons by subjecting the hydrocarbons to proper conditions of temperature, pressure, catalyst, and in the presence of an oxidizing atmosphere to obtain these compounds. It has been the practice in the prior art to employ various types of catalyst such as the oxides and salts of titanium, vanadium, chromium, manganese, molybdenum and cerium as catalyst in the production of the oxygenated compounds such as the alcohols, aldehydes, carboxylic acids and the like.

The feed stocks employed in the prior art processes have comprised the naphthenes, paraffines, and high molecular weight hydrocarbons such as wax and the like. These feed stocks have been admixed with air or other oxygen containing gases and subjected to temperature and pressure conditions either catalytically or non-catalytically to obtain useful oxygenated organic compounds. The prior art catalytic processes, however, have the disadvantage that the catalyst is subject to an induction period in which there is a period of operating time at the outset at which useful products are not obtained and serious and economic loss is suffered. The non-catalytic processes suffer by virtue of higher temperatures being necessary and yields lower than the catalytic processes.

It is, therefore, the main object of the present invention to provide a process in which useful products may be produced at the outset with no useful operating time lost prior to obtaining commercial quantities of the desired product.

Another object of the present invention is to condition or pretreat an oxidation catalyst to allow the catalyst to have enhanced activity for oxygenation of hydrocarbons to useful oxygenated organic compounds.

The objects of the present invention may be achieved by subjecting an oxidation catalyst such as an oxide or salt of the elements such as titanium, vanadium, chromium, manganese, molybdenum, cerium and the like to the action of a heated vaporous hydrocarbon under non-oxidizing conditions prior to contacting the catalyst at oxidizing conditions with a mixture of the hydrocarbon and oxidizing medium, for example air, in proper proportions.

Briefly, the present invention may be described as embodying a process in which two or more catalyst cases containing oxidation catalyst are provided and which the hydrocarbon in a heated vaporous condition is passed through a first case at a temperature higher than oxidizing conditions but without the oxidizing medium and the effluent from this case then mixed with the oxidizing medium and passed to a second catalyst case at temperatures under which oxidation occurs. The effluent from the second catalyst case includes oxygenated products which are then routed through a heater or condenser, depending upon the products obtained, and from thence to a separator where a separation is made among the gasiform materials, oil phase, and water phase. It will thus be apparent that a process is provided in which the hydrocarbon is passed in series through one case, mixed with an oxidizing medium, and then passed through a second case. When the second case becomes spent or shows a decreased activity for oxygenating hydrocarbons, the flow may be reversed and the hydrocarbon passed through the second case and the mixture of hydrocarbon and oxygen containing gas passed through the first case.

The invention will be further illustrated by reference to the drawing in which the single figure is a flow sheet of one method of practicing the invention.

Referring now to the drawing, numerals 11 and 12 describe respectively catalyst cases containing an oxidation catalyst, for example, vanadium pentoxide deposited on 8 to 10 mesh pumice. A hydrocarbon in a heated vaporous condition is introduced by way of manifold 13 into line 14 controlled by valve 15 and thence into catalyst case 11, in which the catalyst is designated by the shaded portion 16. The heated vaporous hydrocarbon passes downwardly through the catalyst case 11 and discharges therefrom by way of line 17, controlled by valve 18 into manifold 19, wherein it is admixed with an oxygen containing gas such as air. The admixture of oxygen containing gas and heated hydrocarbons is then routed by manifold 19 through line 20, controlled by valve 21, upwardly through catalyst case 12 containing a catalyst similar to that contained in catalyst case 11 and which is indicated by the shaded portion 22. The admixture passes upwardly through the catalyst 22 and under conditions maintained sufficient to produce substantial quantities of oxygenated hydrocarbons.

The effluent from the catalyst case 12 issues therefrom through line 23, controlled by valve 24, and discharges into manifold 25, which connects by way of line 26 into condenser or heater 27, which is provided with suitable cooling or heating means indicated by arrow 28 for adjusting the temperature downwardly or upwardly as desired. The oxygenated effluent passes through condenser or heater 27 and discharges by line 29 into a separator 30, which is provided with a heating or cooling means 31, to maintain the contents of the separator in a substantially liquid condition sufficient for mobility and to allow the contents thereof to be pumped.

The separator 30 is provided with a line 32 for release of any gaseous compounds which may accumulate therein and which results from the oxidation reaction, line 33 for separation and removal of an oil phase containing unreacted hydrocarbon and oxygenated products, and line 34 for removal of a water phase containing water and oxygenated compounds soluble therein.

When the catalyst 22 in catalyst case 12 becomes spent or shows a decreased activity for oxidizing hydrocarbons, the flow through the system may be reversed by closing valve 15 in line 14, opening valve 35 in line 36, closing valve 24 in line 23 and opening valve 37 in line 38. Under these conditions the hydrocarbon passes through manifold 13 through open valve 35 in line 36 downwardly through catalyst case 12, the effluent issuing through line 20, controlled by valve 21, passes through manifold 19, is admixed with oxygen introduced into the system by line 16, and passes upwardly through line 17, controlled by valve 18 into catalyst case 11 which has become activated or conditioned by the hydrocarbon passing downwardly therethrough prior to reversal of the operation, and the effluent issues from the catalyst case 11 by line 38, controlled by valve 37, into manifold 25, and thence as described through line 26, condenser or heater 27, line 29 to separator 30 for separation of the products as has been described previously.

It will be apparent from the foregoing description that a continuous operation has been provided in which a reactivated or conditioned catalyst is maintained at all times for oxidation of the hydrocarbons. It will also be obvious that no operating time is lost in conditioning or pretreating the catalyst by proceeding according to the foregoing description.

While not shown in the drawing, it may be desirable to provide, in manifold 19 between lines 17 and 20, a cooling means so that the temperature of the effluent from either catalyst case 11 or catalyst case 12 may be cooled to the oxidation temperature before admixing it with the free oxygen containing gas admitted into the system through line 16. This cooling means may be a suitable heat exchanger device and the temperature differential may be employed to supply heat when necessary to heater or condenser 27 or to the contents of separator 30.

The invention will be further illustrated by the following examples:

An oxidation catalyst was prepared by adding 30 parts of ammonium vanadate to 100 parts of silica hydrogel. The vanadate in the mixture was decomposed with nitric acid and the total mixture which had been treated with nitric acid was washed free of acid with water; the acid-free material was dried and then calcined for 3 hours at 1825° F. This catalyst was then employed to oxidize cyclohexane to maleic acid. The catalyst was ineffective in catalyzing this oxidation.

The catalyst prepared as described in the foregoing description was then pretreated with vaporized cyclohexane and it was found that the pretreatment gave a catalyst of appreciably improved activity and selectivity to maleic acid. The pretreatment operation was conducted by heating the catalyst and the cyclohexane to about 800° F., whereby the cyclohexane was in vaporous condition, and passing it over the catalyst for about four hours. Subsequent to the treatment and before the oxidation was conducted, the hydrocarbons were swept from the catalyst bed by nitrogen and the mixture of hydrocarbon and oxygen was then passed over the catalyst, which had been conditioned, to obtain maleic acid.

The data in the following table compares results obtainable without pretreating the catalyst and with pretreating the catalyst at operations conducted at 600° F., ratios of air to hydrocarbon varying between 120 and 134:1, at contact in the neighborhood of 3 to 3.9 seconds.

Table I

|  | Untreated | Pretreated |  |
|---|---|---|---|
| Temperature, °F | 600 | 600 | 600 |
| Air: Hydrocarbon Ratio | 120 | 121 | 134 |
| Contact Time, Sec | 3.5 | 3.9 | 3.06 |
| Conversion, Mol Per Cent of Total Feed: |  |  |  |
| Maleic Acid | 0.58 | 7.3 | 2.88 |
| CO | 12.0 | 20 | 13.3 |
| Maleic Acid: CO Mol Ratio | 0.04 | 0.36 | 0.21 |

It will be apparent from the foregoing data that pretreating increased the maleic acid conversion twelve-fold where the air-hydrocarbon ratio was substantially 120:1. In the case where the air-hydrocarbon ratio was 134:1, the increase was only about five-fold, which nevertheless is substantial.

Additional runs were then made on the catalyst produced as described above in which the catalyst was pretreated with cyclohexane vapors at about 800° F. and runs were made employing this pretreated catalyst to catalyze the oxidation of a mixture of cyclohexane and air. The data from these runs are presented in the following table:

Table II

|  | Untreated | Pretreated |  |  |  |  |
|---|---|---|---|---|---|---|
| Temperature, °F | 600 | 600 | 600 | 600 | 600 | 600 |
| Air: Hydrocarbon Ratio | 195 | 165 | 167 | 200 | 195 | 195 |
| Contact Time, Sec | 3.2 | 3.0 | 3.0 | 3.0 | 3.0 | 3.0 |
| Conversion to Maleic Acid, Mol Per Cent of Total Feed | 3.95 | 9.4 | 5.4 | 5.8 | 6.2 | 6.2 |

It will be apparent from the foregoing data in Table II that a substantial improvement was also obtained at higher air to hydrocarbon ratios by employing a pretreated catalyst over that obtained when an untreated catalyst was employed as in conventional practice.

It will also be apparent from these runs which, in this case, were successive 5-hour runs, that the activity of the catalyst in each instance showed a gradual decline over that obtained in the outset until the yield was about 65% of the yield obtained during the first 5-hour period of operation with the catalyst treated in accordance with the present invention. By periodically reversing the flow and passing hydrocarbon only through one of a plurality of cases and passing hydrocarbon and oxygen mixture through at least a second of a plurality of cases containing oxidation catalyst, it will be possible to produce high yields of useful oxygenated compounds without interruption.

While the invention has been described by reference to passing the hydrocarbons serially through one of a plurality of catalyst cases and then admixing it with oxygen containing gas and then passing the mixture through another of a plurality of cases, it will be apparent to the skilled worker that other methods may be used to obtain the same end. For example, a catalyst case may be so designed that air may be injected after hydrocarbon has contacted a portion of the catalyst, such as about half of the catalyst, followed by a reversal in direction of hydrocarbon flow periodically as the catalyst in contact with the oxygen containing mixture loses its activity. This will maintain the catalyst activity at a high level. A preferred procedure, however, is that described in which a plurality of catalyst cases is employed in series with the hydrocarbon entering the first of the plurality of cases and the oxygen containing hydrocarbon mixture entering the second of the plurality of catalyst cases.

The invention has been described by reference to the oxidation of cyclohexane. It is intended that the invention not be limited or restricted to cyclohexane or other naphthenic hydrocarbons. It is equally applicable to oxidation of paraffinic hydrocarbons such as propane, butane, pentane, hexane, heptane and the like. Similarly, other naphthenic hydrocarbons besides cyclohexane may be oxidized as stated before. As exemplary of the other naphthenic hydrocarbons, may be mentioned cyclopentane and the higher members of the same homologous series.

The temperatures to be employed in the practice of the present invention will generally include those temperatures found useful in oxidizing hydrocarbons. The temperature at which the oxidation will be conducted may range from 500 to 1000° F., depending on the hydrocarbon being oxidized. It will be generally desirable to conduct the pretreating operation at a temperature substantially greater than the oxidation operation. For example, as shown when oxidizing cyclohexane with maleic acid, the pretreatment may be conducted at a temperature of 800° F. and the oxidation at a temperature of 600° F. Generally it will be desired to conduct the pretreating operation at a temperature at least 50° F. greater than the temperature at which the oxidation is conducted. However, when oxidation is conducted at temperatures approaching 1000° F. the pretreatment may be conducted at a similar temperature, provided the contact is short enough to minimize cracking reactions.

The nature and objects of the present invention having been fully illustrated and described, what I wish to claim as new and useful and to secure by Letters Patent is:

A method for oxidizing cyclohexane which includes the steps of forming a bed of vanadium pentoxide, heating said bed to a temperature of approximately 800° F., passing a heated vaporous stream of cyclohexane at a temperature of about 800° F. over said bed for a time sufficient to activate said bed, forming an admixture of cyclohexane with an oxygen-containing gas, reducing the temperature of said activated bed from about 800° F. to approximately 600° F. and subsequently passing said admixture at a temperature of approximately 600° F. over said activated bed to obtain improved yields of maleic acid from the cyclohexane in said admixture.

ALBERT J. SHMIDL.

REFERENCES CITED

The following references are of record in the file of this patent:

UNITED STATES PATENTS

| Number | Name | Date |
| --- | --- | --- |
| 2,079,490 | Conover | May 4, 1937 |
| 2,114,798 | Foster | Apr. 19, 1938 |
| 2,118,567 | Milas et al. | May 24, 1938 |
| 2,168,844 | Nelles | Aug. 8, 1939 |
| 2,206,377 | Weiss | July 2, 1940 |
| 2,260,409 | Slotterbeck et al. | Oct. 28, 1941 |

OTHER REFERENCES

Lubarsky et al.: "Comptes Rendus," (U. S. S. R.), vol. 29, pages 575–6 (1940). Copy in 260–668 D.